US006285858B1

(12) United States Patent
Yoshida

(10) Patent No.: US 6,285,858 B1
(45) Date of Patent: Sep. 4, 2001

(54) ELECTRONIC TOLL COLLECTION SYSTEM AND METHOD FEATURING ANTENNA ARRANGEMENT

(75) Inventor: Yasuharu Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/187,742

(22) Filed: Nov. 9, 1998

(30) Foreign Application Priority Data

Nov. 7, 1997 (JP) .................................................. 9-322226

(51) Int. Cl.[7] ........................................................ H04B 5/00

(52) U.S. Cl. .............................. 455/41; 340/928; 342/42; 343/719

(58) Field of Search ............................... 455/41, 73, 517, 455/523; 342/42; 340/928; 343/719

(56) References Cited

U.S. PATENT DOCUMENTS

| | | | | |
|---|---|---|---|---|
| 4,806,943 | | 2/1989 | Doncel . | |
| 5,192,954 | | 3/1993 | Brockelsby et al. . | |
| 5,424,727 | * | 6/1995 | Shieh | 340/928 |
| 5,705,996 | * | 1/1998 | Eguchi et al. | 340/928 |
| 5,757,285 | * | 5/1998 | Grabow et al. | 455/517 |
| 5,760,709 | * | 6/1998 | Hayashi | 455/115 |
| 5,872,525 | * | 2/1999 | Fukasawa et al. | 340/928 |
| 5,955,970 | * | 9/1999 | Ando et al. | 340/928 |
| 5,983,075 | * | 11/1999 | Akutsu | 455/41 |

FOREIGN PATENT DOCUMENTS

| | | |
|---|---|---|
| 2 566 349 | 12/1985 | (FR) . |
| 2 612 715 | 9/1988 | (FR) . |
| 43 27 385 A1 | 12/1995 | (GB) . |
| 49-64309 | 6/1974 | (JP) . |
| 49-65721 | 6/1974 | (JP) . |
| 50-11613 | 2/1975 | (JP) . |
| 52-1477 | 1/1977 | (JP) . |
| 52-1478 | 1/1977 | (JP) . |
| 53-9009 | 1/1978 | (JP) . |
| 59-8092 | 2/1984 | (JP) . |
| 61-220098 | 9/1986 | (JP) . |
| 63-164636 | 7/1988 | (JP) . |
| 7-131406 | 5/1995 | (JP) . |
| 7-177063 | 7/1995 | (JP) . |
| 8-180223 | 7/1996 | (JP) . |
| 8-244560 | 9/1996 | (JP) . |
| 8-340284 | 12/1996 | (JP) . |
| 10-82642 | 3/1998 | (JP) . |
| WO 91/08557 | 6/1991 | (WO) . |

OTHER PUBLICATIONS

European Search Report dated Mar. 1, 2000.

Japanese Office Action dated Feb. 8, 2000, with partial translation.

(List continued on next page.)

*Primary Examiner*—Nay Maung
*Assistant Examiner*—Quochien B. Vuong
(74) *Attorney, Agent, or Firm*—McGinn & Gibb, PLLC

(57) ABSTRACT

A system for establishing radio communications between an in-vehicle unit and a road unit, including a signal controller in response to an output of an approaching vehicle detector, includes an on-board antenna forming part of the in-vehicle unit and provided to have directivity toward a road surface, a plurality of stationary devices, which form part of the road unit, provided in series between the signal controller and a terminator, and respectively coupled to the plurality of stationary antennas, and a plurality of stationary devices forming part of the road unit and provided in series between the signal controller and a terminator, and respectively coupled to the plurality of stationary antennas. Each of the plurality of stationary devices branches a signal transmitted thereto from the signal controller and applies the signal to the corresponding stationary antenna, and applies a signal transmitted thereto from the on-board antenna to the signal controller.

3 Claims, 4 Drawing Sheets

OTHER PUBLICATIONS

Japanese Office Action Dated Nov. 2, 1999 with partial translation.

Ozeki, et al, "Broadbanding of a Microstrip Antenna", Mar. 1997, p. 114.

Yamamoto, et al, "A Consideration on Shorted Microstrip Antenna with Notch Element", Mar. 1997, p. 115.

Nakahara, et al, "Characteristics of a leaky coaxial cable with slots along a zigzag line" 1967.

* cited by examiner

ELECTRONIC TOLL COLLECTION SYSTEM AND METHOD FEATURING ANTENNA ARRANGEMENT

BACKGROUND OF THE INVENTION

1. Field of the Invention

The present invention relates generally to improved techniques for establishing radio communications between a vehicle and a roadside network, and more specifically to such techniques for use in ITS (Intelligent transportation systems). Still more specifically, the present invention is well suited for effectively establishing radio communication links between an in-vehicle unit and a roadside unit in an ETC (electronic toll collection) system.

2. Description of the Related Art

In an effort to solve a variety of transportation problems, a broad range of diverse technologies, known collectively as ITS, have been proposed. Among others, the ETC system has been found extremely preferable to eliminate traffic congestion and backups on toll booths.

Before turning to the present invention, it is deemed advantageous to briefly describe, with reference to FIG. 1, a conventional technique that may be relevant to the present invention.

As shown in FIG. 1, an antenna 10 is provided high on a pole 12 that is located on a roadside. When a moving vehicle approaches a toll facility or booth (not shown), the vehicle is detected using an approaching vehicle detecting unit 14 that is usually comprised of two devices located on each side of a lane (as best shown in FIG. 3). In FIG. 1, two vehicles 16 and 18 are schematically illustrated, which carry respectively in-vehicle units 20 and 22 for establishing a two-way communication with roadside network through the antenna 10. Each of the units 20 and 22 is located on a dashboard and includes an antenna (not shown). However, the above-mentioned conventional technique suffers from the following problem. That is, if the vehicle 16, which is a usual sedan in this case, approaches the pole 12 (viz., toll booth) immediately following the vehicle 18 (viz., a truck with a tall cargo room), the radio communication between the in-vehicle unit 20 and the antenna 10 is undesirably blocked. Since the radio communication is made via a direct wave, the quality of data to be transmitted is deteriorated to such an extent that the data is not correctly exchanged.

Accordingly, what is desired is to establish radio communication links which are not blocked by a tall vehicle.

SUMMARY OF THE INVENTION

It is therefore an object of the present to provide a technique via which a radio communication path is not blocked by a preceding tall vehicle.

Another object of the present invention is to provide a technique via which a radio communication can be established using an extremely small electromagnetic power.

In brief, these objects are achieved by techniques wherein in order to establish radio communications between an in-vehicle unit mounted on a vehicle and a roadside unit, a unique antenna arrangement is provided. That is, an on-board antenna is operatively coupled to the in-vehicle unit and has directivity toward a road surface. Further, a stationary antenna means is operatively coupled to the roadside unit. The stationary antenna is provided at approximately a center portion of a vehicle lane in such a manner as to have directivity toward an upward direction. Thus, a very short distance of radio communication can be formed thereby to eliminate radio wave interference caused by a big vehicle.

One aspect of the present invention resides in a system for establishing radio communications between an in-vehicle unit mounted on a vehicle and a roadside unit, comprising: an on-board antenna mounted on the vehicle, the on-board antenna being operatively coupled to the in-vehicle unit and having directivity toward a road surface; and stationary antenna means operatively coupled to the roadside unit, the stationary antenna being provided at approximately center portion of a vehicle lane in a manner to have directivity toward an upward direction.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
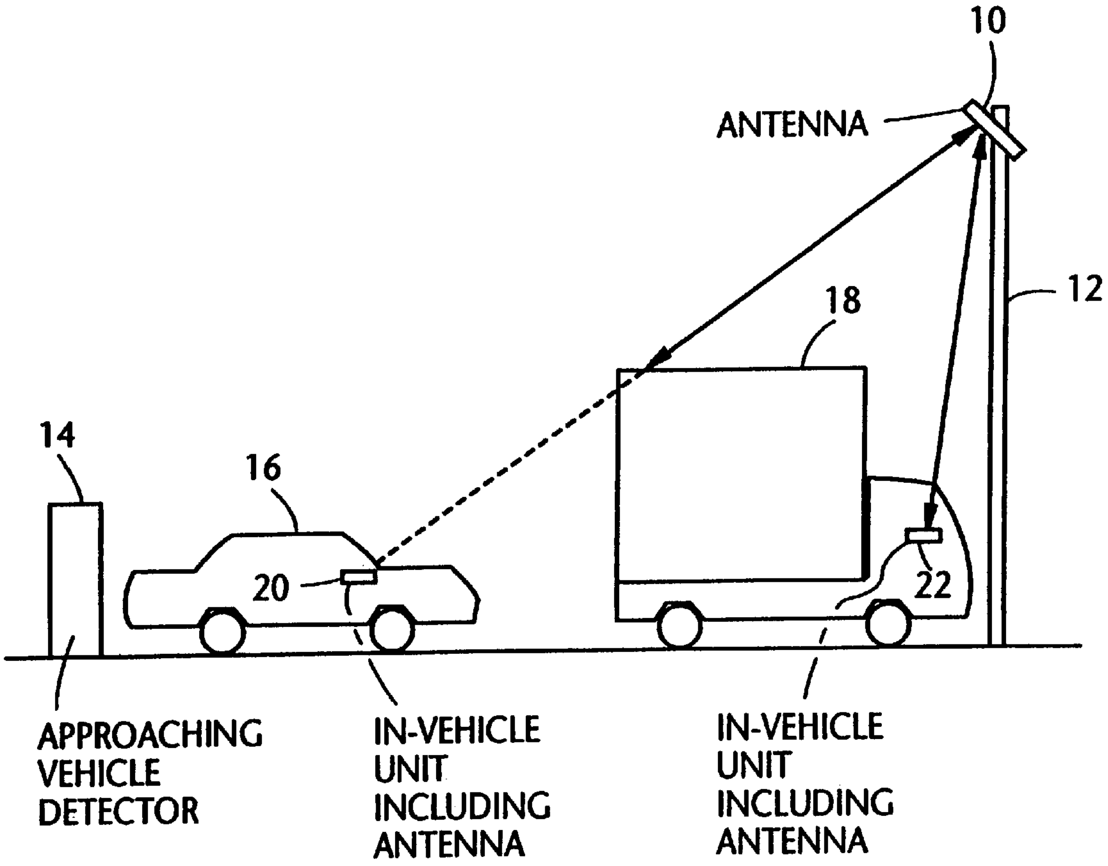
FIG. 1 (PRIOR ART)
FIG. 1 is a diagram schematically showing part of an ETC system wherein an antenna coupled to a roadside network communicates with an in-vehicle unit mounted on a moving vehicle, having been referred to in the opening paragraphs.

A first embodiment of the present invention will be described with reference to FIGS. 2 and 3. The portions already referred to with respect to FIG. 1 will not be described for brevity.

Figure 3:
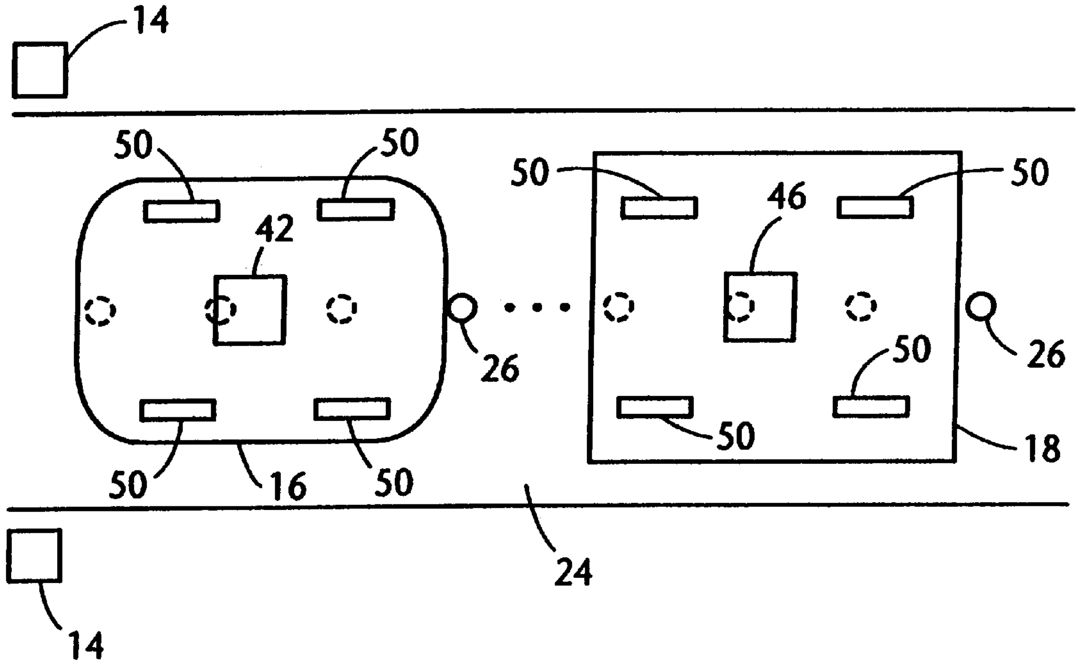
FIG. 3 is a diagram schematically showing two vehicles on a lane for a better understanding of the first embodiment shown in FIG. 3.

As shown, a plurality of antennas 26 is provided in a manner to be embedded at a center portion of a lane 24 (FIG. 3). More specifically, the antennas 26 are coupled in series and provided along a centerline of the lane 24. Each antenna 26 may be a plate-like antenna such as a microstrip antenna. However, the antennas, used in the present invention, are in no way limited to the plate-like antenna and may take any form suitable to be located on the lane or embedded therein. By way of example, a microstrip antenna, which may preferably be used with the present invention, is disclosed in a paper entitled "Broadbanding of a Microstrip Antenna" by H. Ozeki, et al., published March 1997 by "The Institute of Electronics, Information and Communication Engineers" of Japan. As an alternative, a microstrip antenna, which can be used as the antenna 26, is disclosed in a paper entitled "A consideration on Shorted Microstrip Antenna" by H. Yamamoto, et al., published March 1997 by the same institute as mentioned above. It is understood that each of the antennas 26 has directivity in an upward direction.

The antennas 26 are respectively coupled to corresponding devices 28 for splitting and combining signals. That is, the signal outputted from a roadside control unit 30 is split or divided at each device 28 and then applied to the corresponding antenna 26 (downlink). On the other hand, the signals from the antennas 26 are combined at the signal splitting/combining device 28 (uplink). One end of the serially connected devices 28 is coupled to a terminator 32, and the other end thereof is coupled to the roadside control unit 30 which comprises a duplexer 34, a transmitter 36, a receiver 38, and a controller 40.

Another controller 41 is provided to supervise an overall operation of the electronic toll collection system to which the present invention is applicable. However, the controller 41 is not directly concerned with the present invention and thus a detailed description thereof will be omitted for the sake of simplifying the disclosure. For further details of the operation of the ETC system, reference should be made to U.S. Pat. No. 5,424,727 granted to Jin S. Shieh.

Figure 2:
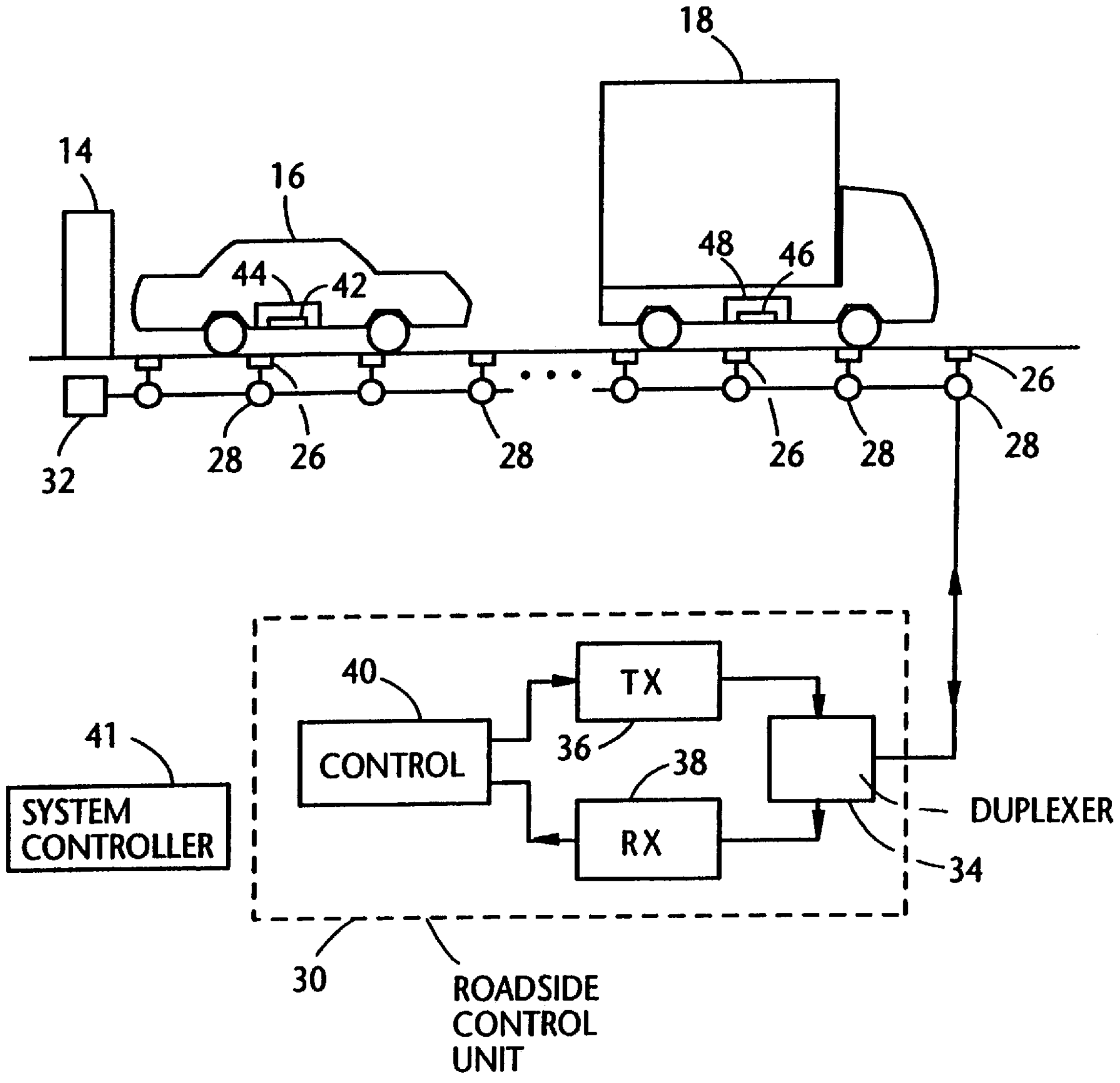
FIG. 2 is a diagram schematically showing a first embodiment of the present invention.

As shown in FIG. 2, the vehicle 16 carries an antenna 42 which is installed within an in-vehicle (or on-board) unit 44 in the illustrated case. However, it is practically preferable to separately provide the antenna 42 with respect to the in-vehicle unit 44, in the case of which the antenna 42 is operatively coupled to the unit 44 via a suitable cable. In FIG. 2, the antenna 42 faces the road surface through an opening (not shown) whereby the antenna 42 has directivity toward the lane (road) surface. Thus, a two-way radio communication link can be established between the antenna 42 and the corresponding antenna 26. In exactly the same manner, the other vehicle 18 is also equipped with an antenna 46 that is coupled to an in-vehicle unit 48. FIG. 3 is a schematic plan view showing a manner where each of the vehicles 16 and 18 travels while the corresponding in-vehicle unit communicates with the roadside control unit 30 via the antennas 42 (or 46) and 26. In FIG. 3, each reference numeral 50 depicts a vehicle wheel.

The first important feature of the present invention is that there exists no problem that the radio link may be interfered by an obstacle (such as a big vehicle as in the prior art). The second important feature of the present invention is that the radio link can well be established using an extremely small electromagnetic power. This is highly preferable in that the instant invention can be used without consideration of the very strict radiation power regulations in most countries.

In the above, the antenna 42 may be installed in other suitable portions of the vehicle 16, such as a rear or front portion of the vehicle 16, under the condition that the electric wave can be directed toward the road surface.

The operation of the first embodiment will briefly be described. The frequencies used for the uplink and downlink are usually different. The data is transmitted using multiple access techniques such as slotted-ALOHA. The data communication is carried out on a frame basis wherein each frame is comprised of two to five slots. One phase is transmitted using one slot. When a vehicle is detected at the detecting unit 14, the control unit 40 activates the transmitter 36 and assigns one slot to the detected vehicle. Therefore, it is possible for the control unit 40 to communicate with a plurality of vehicles through the use of plural slots.

Figure 4:
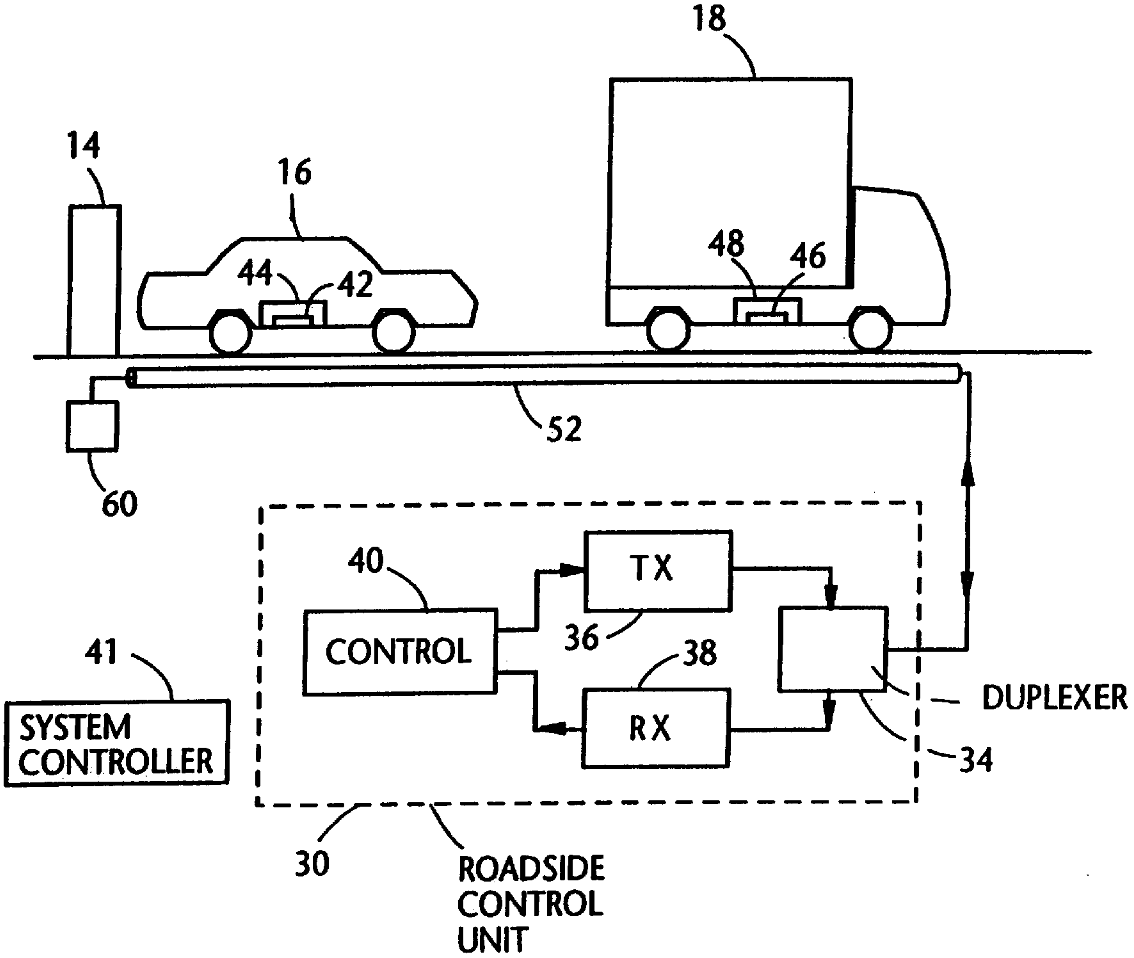
FIG. 4 is a diagram schematically showing a second embodiment of the present invention.
Figure 5:
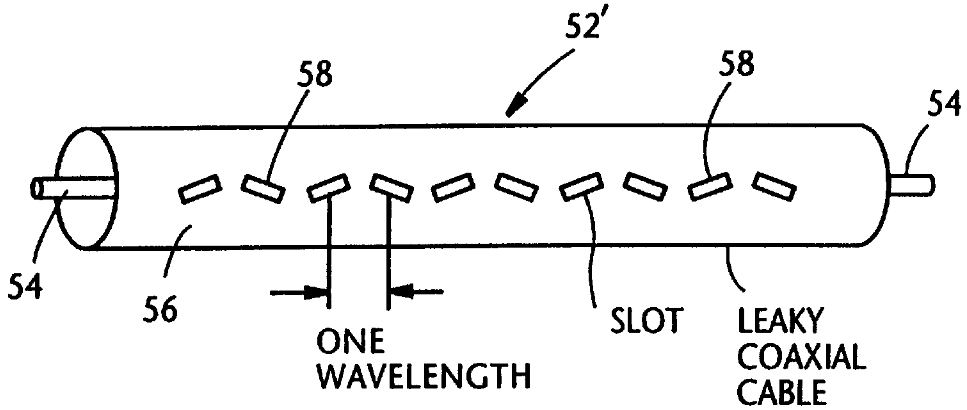
FIG. 5 is a sketch showing a leaky coaxial cable which is applied to the second embodiment of the present invention.

A second embodiment of the present invention will be described with reference for FIGS. 4 and 5.

The second embodiment differs from the first embodiment in that the second embodiment uses a leaky conductive line 52 in place of the combined arrangement of the antennas 26 and the devices 28 (FIG. 2). The leaky conductive line 52 has one end coupled to a terminator 60 and the other end coupled to the roadside control unit 30. Other than this, the second embodiment is substantially identical with the first one and accordingly, the descriptions of the portions already referred to in relation to FIGS. 2 and 3 will be omitted for simplifying the disclosure.

One example of the leaky conductive line 52 is a leaky coaxial cable that is disclosed in a paper entitled "Characteristics of a leaky coaxial cable with slots along a zigzag line" by T. Nakahara, et al., published in 1967 by "The Institute of Electronics, Information and Communication Engineers" of Japan. As shown in FIG. 5, the above mentioned leaky coaxial cable (denoted by 52') comprises an inner conductive pipe (made of aluminum (for example)) 54 which is provided in the interior of an outer conductive tube 56. A plurality of rectangular slots 58 is provided along a zigzag line. A distance between center portions of adjacent slots is approximately equal to one wavelength of a radio wave to be used. In accordance with the aforesaid paper, the leaky coaxial cable 52' with the slots provided in zigzag is able to strengthen a leaky wave mode while suppressing a surface wave mode of fundamental wave. Accordingly, it is possible to effectively provide a uniform electromagnetic field distribution in the vicinity of the cable. It is to be noted that although the term "leaky" is used, the cable 52' is able to receive the electric wave in addition to the transmission of the electric wave. In the above, a space between the inner conductive pipe 54 and the outer tube 56 is filled by a suitable dielectric material. Further, although not shown in FIG. 5, a protective resin film is used to cover the outer tube 56.

Noting that the use of the leaky coaxial cable 52' is exemplary and the instant invention is in no way limited thereto. That is, a leaky waveguide is also applicable to the instant invention. In the instant disclosure, a leaky conductive line is collective used or defined which includes the aforesaid leaky coaxial cable, the leaky waveguides, etc. It is understood that the second embodiment is advantageously simple in construction compared with the first embodiment which includes the combined arrangement of the antennas 26 and the signal splitting/combining devices 28.

In the foregoing, the present invention has been discussed when applied to the ETC system. However, it is to be noted that the instant invention is applicable to establish radio communications between moving vehicles and the roadside network.

It will be understood that the above disclosure is representative of only two possible embodiments of the present invention and that the concept on which the invention is based is not specifically limited thereto.

What is claimed is:

1. A system for establishing radio communications between an in-vehicle unit and a road unit, including a signal controller, in response to an output of an approaching vehicle detector, said system comprising:

- an on-board antenna, which forms part of said in-vehicle unit, provided to have directivity toward a road surface;
- a plurality of stationary antennas, which form part of said road unit, provided in tandem and at intervals at an approximately center portion of a vehicle land to have directivity in an upward direction; and
- a plurality of stationary devices, which form part of said road unit, provided in series between said signal controller and a terminator, and respectively coupled to said plurality of stationary antennas,
- wherein each of said plurality of stationary devices branches a signal transmitted thereto from said signal controller and applies the signal to the corresponding stationary antenna, and applies a signal transmitted thereto from said on-board antenna to said signal controller.

2. The system as claimed in claim 1, wherein when a plurality of vehicles are traveling while communicating with said road unit, two or more of said stationary devices synthesize signals from the corresponding stationary antennas and apply the synthesized signal to said signal controller.

3. The system as claimed in claim 1, wherein said on-board antenna is provided at a bottom, front, or rear of a vehicle.

* * * * *